United States Patent
Ohmi et al.

(10) Patent No.: US 6,178,995 B1
(45) Date of Patent: Jan. 30, 2001

(54) FLUID SUPPLY APPARATUS

(75) Inventors: Tadahiro Ohmi, Miyagi; Tetu Kagazume; Kazuhiko Sugiyama, both of Yamanashi; Ryousuke Dohi, Osaka; Yukio Minami, Osaka; Kouji Nishino, Osaka; Kouji Kawata, Osaka; Nobukazu Ikeda, Osaka; Michio Yamaji, Osaka, all of (JP)

(73) Assignees: Fujikin Incorporated, Osaka; Tokyo Electron Ltd., Tokyo; Tadahiro Ohmi, Miyagi, all of (JP)

( * ) Notice: Under 35 U.S.C. 154(b), the term of this patent shall be extended for 0 days.

(21) Appl. No.: 09/355,872
(22) PCT Filed: Jan. 11, 1999
(86) PCT No.: PCT/JP99/00062
§ 371 Date: Aug. 5, 1999
§ 102(e) Date: Aug. 5, 1999
(87) PCT Pub. No.: WO99/38057
PCT Pub. Date: Jul. 29, 1999

(30) Foreign Application Priority Data

Jan. 21, 1998 (JP) .................................. 10-009961

(51) Int. Cl.⁷ ................................................ G05D 7/06
(52) U.S. Cl. ....................................... 137/486; 137/487.5
(58) Field of Search .................... 137/486, 487.5

(56) References Cited

U.S. PATENT DOCUMENTS 5,669,408 * 9/1997 Nishino et al. .................... 137/487.5
5,816,285 * 10/1998 Ohmi et al. ....................... 137/487.5

FOREIGN PATENT DOCUMENTS 9-94451 * 4/1997 (JP) ...................................... 137/486

* cited by examiner

Primary Examiner—Gerald A. Michalsky
(74) Attorney, Agent, or Firm—Griffin & Szipl, P.C.

(57) ABSTRACT

A fluid feeding apparatus includes parallel flow passages connected at their downstream side, each parallel passage including a pressure flow controller (C) for regulating the flow of fluid and a fluid changeover valve (D) for opening and closing the passage on the downstream side of the pressure flow controller. A fluid feeding control unit (B) controls the pressure flow controllers and changeover valves so that when a changeover valve is closed a control valve (1) upstream of the changeover valve is also closed to prevent a pressure buildup at the changeover valve. In addition to the control valve (1), each pressure flow controller includes an orifice (5) downstream from the control valve, a pressure detector (3) for sensing pressure ($P_1$) in the passage at a point between the control valve and the orifice, and a calculation control unit (6) for producing a control signal Qy for controlling the drive (2) for the control valve. The calculation control unit first calculates a flow rate signal $Qc = KP_1$, where K is a constant and $P_1$ is the pressure sensed by the pressure detector. The calculation control unit then calculates Qy as the difference between a set point or flow rate specifying signal Qs and the calculated value Qc. Thus, the flow rate on the downstream side of the orifice is controlled by regulating the pressure $P_1$ on the upstream side of the orifice via the control valve. The fluid feeding apparatus avoids transient overshooting at the start of fluid feeding and at fluid changeover time and is suitable for use in semiconductor manufacturing facilities and other gas supply systems where high precision is required.

6 Claims, 14 Drawing Sheets

FLUID SUPPLY APPARATUS

BACKGROUND OF THE INVENTION

1. Field of the Invention

The present invention relates to an improvement of an apparatus for feeding various kinds of fluids such as gas for use in the manufacture of semiconductors, chemicals, precision machine parts, and the like. More particularly, this invention relates to a fluid feeding apparatus which permits high precision control of the flow rate of fluid at the times of starting to feed a fluid and of switching fluids from one kind to another.

2. Description of the Prior Art

Fluid feeding apparatuses requiring control with high precision of the flow rate are used in semiconductor manufacturing facilities and chemical production plants. Most of those apparatuses are equipped with so-called mass flow controllers.

FIG. 8 shows an apparatus for feeding fluid (gas) for use in a high purity moisture generator in semiconductor manufacturing facilities. It is designed so that $H_2$ and $O_2$ are fed to a reactor 51 from a gas feeding apparatus 50 at specific flow rates and are radicalized with a platinum catalyst and allowed to react with each other in a non-combustion state to generate moisture gas (water vapor). The moisture gas thus generated in the reactor 51 is then supplied to an oxidizing furnace 52.

In FIG. 8, the reference numeral 54 designates a circuit for measuring moisture generation responsiveness of the reactor 51, and includes a suction rate regulating valve 55, a quadrupole mass spectrometer (Q-mass spectrometer) 56, a turbo molecular pump 57, and a vacuum pump 58.

The Q-mass spectrometer 56 is for measuring ion concentrations of $H_2O$, $H_2$, $O_2$, and $N_2$. A quadrupole mass analyzer MSQ-150A (ULVAC Corporation, Japan) is used for the purpose. The aforesaid gas feeding apparatus 50 is formed from three mass flow controllers $MFC_1$, $MFC_2$, and $MFC_3$, changeover valves $V_1$, $V_2$, and $V_3$, gas storage containers (not shown), and pressure regulators (not shown). The changeover valves $V_1$, $V_2$, and $V_3$ in this example are of the electric metal diaphragm type.

From the respective gas storage containers (not shown), $H_2$ at a gauge pressure of 2 $kgf/cm^2$, $O_2$ at a gauge pressure of 2 $kgf/cm^2$, and $N_2$ at a gauge pressure of 6 $kgf/cm^2$ are supplied to the primary sides of the three mass flow controllers $MFC_1$, $MFC_2$, and $MFC_3$.

To generate moisture in the reactor 51, in the meantime, the flow rates and other conditions of the three mass flow controllers $MFC_1$, $MFC_2$, and $MFC_3$ in the gas feeding apparatus 50 are set, and then the system is purged with $N_2$, $V_1$ and $V_2$ being closed and $V_3$ being opened. Then $V_3$ is closed and $V_2$, is opened to supply $O_2$, and at the same time that $O_2$ is supplied, or about 3 seconds after the $O_2$ supply, $V_1$ is opened to supply $H_2$. Thus, moisture gas (water vapor) starts to be generated in the reactor 51.

Part of the moisture gas or the like from the reactor 51 is sucked into the measurement circuit 54 for a specific time by operating the suction-regulating valve 55, where the concentrations of $H_2$, $O_2$, $H_2O$, and $N_2$ in the generated moisture are measured by the Q-mass spectrometer 56.

FIGS. 9 to 11 illustrate the concentrations of $H_2$, $O_2$, $N_2$, and $H_2O$ measured by the Q-mass spectrometer 56 in the moistures produced in a moisture-generating testing arrangement. The testing arrangement was provided with a gas feeding apparatus 50 equipped with the mass flow controllers as shown in FIG. 8. And the measurements were taken under the following conditions (1), (2), and (3). The gauge pressure of $H_2$, $O_2$, and $N_2$ on the primary sides of the mass flow controllers in the gas feeding apparatus 50 were 2 $kgf/cm^2$, 2 $kgf/cm^2$, and 6 $kgf/cm^2$, respectively.

(1) Pressure on the secondary side of the mass flow controllers: 1 $kg/cm^2$ abs
$H_2$: 50 sccm+$O_2$: 1000 sccm
$N_2$: 1000 sccm
$H_2$ starts to be fed 3 seconds after $O_2$ supply.

(2) Pressure on the secondary side of the mass flow controllers: 0.5 $kg/cm^2$ abs
$H_2$: 50 sccm +$O_2$: 1000 sccm
$N_2$: 1000 sccm
$H_2$ starts to be fed 3 seconds after $O_2$ supply.

(3) Pressure on the secondary side of the mass flow controllers: 0.2 $kg/cm^2$ abs
$H_2$: 50 sccm+$O_2$: 1000 sccm
$N_2$: 1000 sccm
$H_2$ starts to be fed 3 second after $O_2$ supply.

It is to be understood that "sccm" is a unit indicating the flow rate/minute in volume ($cm^3$) of $H_2$, $O_2$, $N_2$, etc. in the standard state. As is evident from FIGS. 9 to 11, the concentration of $H_2$ rises and peaks at a peak $P_{H2}$ at the start of the gas feeding as the pressure decreases on the secondary side of the mass flow controllers MFC's (pressure reduction) in the moisture generation testing arrangement provided with the gas feeding apparatus 50 equipped with mass flow controllers. Along with that, there appears a peak $P_{H2}O$ in the concentration of $H_2O$.

$H_2$ and $H_2O$ peak at $P_{H2}$ and $P_{H2O}$ in the initial stage of the gas feeding. That means it is impossible to precisely effect $H_2$ concentration control (flow rate control). The mass flow controller cannot meet the demand for high precision control of the flow rate of $H_2$.

It should also be noted that if the peak $P_{H2}$ of the concentration of $H_2$ rises to several percent, there will arise a possibility of hydrogen exploding in the downstream oxidizing furnace 52, raising a safety problem.

On the other hand, FIGS. 12 to 13 also show the concentrations of $H_2$, $O_2$, $N_2$, and $H_2O$ measured by the Q-mass spectrometer 56 in the moistures produced in a moisture-generating testing arrangement. The testing arrangement was provided with a gas feeding apparatus 50 equipped with the mass flow controllers as shown in FIG. 8. And the measurements were taken under the following conditions (1) and (2). The supply pressures (gauge pressures) of $H_2$, $O_2$, and $N_2$ on the primary sides of the mass flow controllers were 2 $kgf/cm^2$, 2 $kgf/cm^2$, and 6 $kgf/cm^2$, respectively.

(1) Pressure on the secondary side of the mass flow controllers: 0.5 $kg/cm^2$ abs
$H_2$: 100 sccm+$O_2$: 50 sccm ($H_2$:$O_2$=2:1)
$N_2$: 1000 sccm
$H_2$ and $O_2$ started to be fed simultaneously and were cut off at the same time.

(2) Pressure on the secondary side of the mass flow controllers: 0.5 $kg/cm^2$ abs
$H_2$: 100 sccm+$O_2$: 50 sccm ($H_2$:$O_2$=2:1)
$N_2$: 1000 sccm
$H_2$ started to be fed 3 seconds after $O_2$ supply and the feeding of $H_2$ was cut off three minutes earlier than $O_2$ cut-off.

As is clear from FIG. 12, the concentration peak $P_{H2}$ of $H_2$ in the initial stage of gas feeding rises to some 10 percent if $H_2$ and $O_2$ are fed simultaneously in the gas feeding apparatus 50 equipped with the prior art mass flow controller and there arises a safety question.

Furthermore, the concentration $P_{O2}$ of $O_2$ suddenly falls in the region where a peak $P_{H2}$ of $H_2$ is observed because $O_2$ is consumed in its reaction with $H_2$. As a result, it will be impossible to generate an intended quantity of moisture.

Also, as is shown in FIG. 13, the concentration peak $P_{H2}$ of $H_2$ increases to more than some 50 percent at the beginning of gas feeding in the gas feeding apparatus 50 using the prior art mass flow controller, further increasing the danger.

In addition, a large quantity of $O_2$ is consumed at the aforesaid peak $P_{H2}$ of $H_2$, resulting in a substantial fall in the concentration $O_2$. That makes it difficult to produce a required amount of moisture.

As set forth above, the gas feeding apparatus 50 equipped with the prior art mass flow controllers has a problem that the flow rate of $H_2$ and $O_2$ is impossible to control with high precision, because $H_2$ and $O_2$ flow in excessively in what is called an overshooting in the initial stage of the gas feeding or suspension.

In generating moisture in the gas feeding apparatus 50 with the mass flow controllers, it is natural that the amount of moisture generated deviates greatly from the set level, because of the overshooting of $H_2$ and $O_2$, and it is difficult to control the generation of moisture with high precision.

In the meantime, in the manufacture of semiconductors or the like, it is often necessary to feed many different kinds of gases at specific flow rates to specific places or switch the feeding from one kind to another. Also, it is necessary to supply to specific places high purity water produced through a reaction between $H_2$ and $O_2$. It is always required that the supply or switchover of gases and $H_2O$ should be effected quickly with high precision. That is because high precision control of the flow of gases and moisture is indispensable to improving or securing the production yield as well as the quality of finished products or semiconductors.

SUMMARY OF THE INVENTION

The present invention is to address the foregoing problems encountered with the apparatus for feeding gases or the like which is equipped with the prior art mass flow controller. That is, the prior art fluid feeding apparatus provided with a mass flow controller fails to control the flow of fluid with high precision on account of what is called the overshooting of fluid occurring in the initial stage of the fluid supply.

It is an object of the present invention, therefore, to provide a fluid feeding apparatus that permits control of the flow rate of gases with very high precision over the whole process, from the start of fluid feeding to its suspension, without causing transient phenomena such as the overshooting of feeding gases. The foregoing object is achieved by adopting a pressure flow controller in place of the mass flow controller in the fluid feeding apparatus and also by employing a solenoid-driven high speed actuating type changeover valve as the fluid switchover control valve. When used in semiconductor manufacturing facilities, for example, this feeding apparatus makes it possible to realize ideal initial film formation of semiconductors of high integration by controlling the generation of moisture with high precision.

To find the cause of the overshooting phenomenon of fluids just after the start and suspension of supply of fluids, various experiments were carried out using the moisture generation testing arrangement shown in FIG. 8.

As a result, it was discovered that most of the overshooting fluid (gas) in the fluid feeding apparatus 50 with the prior art mass flow controller is the fluid (gas) dwelling in pipe sections $L_1$ to $L_3$ connecting the respective changeover valves $V_1$ to $V_3$ and mass flow controllers $MFC_1$ to $MFC_3$. The experiments also indicated that the construction of the mass flow controllers $MFC_1$ to $MFC_3$ was responsible for increasing the dwelling of fluid (gas), that is, the cause of the aforesaid overshooting.

FIG. 14 is a block diagram showing the basic configuration of the prior art mass flow controller. In FIG. 14, the gas flowing in from the primary side is divided into portions flowing through a laminar flow bypass 59 and a sensor bypass 60. In the sensor bypass 60, the mass flow of the fluid is determined by a sensor 61 in the form of temperature change in proportion thereto. The determined temperature change is converted into electric signals in a bridge circuit 62 and output through an amplifier circuit 63 and others to a display 64 and also to a comparison control circuit 65 as linear voltage signals.

Meanwhile, the set signals from outside are input from a setter 66 into the comparison control circuit 65, where the difference between the aforesaid detected signals and the set signals is calculated. The signal difference is then sent into a valve drive 67, which actuates a flow control valve 68 to bring the signal difference to zero.

Now, if the changeover valve $V_1$ mounted on the secondary side is suddenly closed while the mass flow controller is in operation, the gas flowing through the sensor 61 comes to a standstill. Then the control system of the mass flow controller works transiently to increase the flow of gas and the flow control valve 68 is opened. As a result, the gas pressure in the secondary side line $L_1$ rises, causing the gas to dwell therein. And next time the changeover valve $V_1$ is opened, the dwelling gas rushes into the gas consuming side through the changeover valve $V_1$, causing a gas overshooting phenomenon.

Finding such structural characteristics in the mass flow controller, the inventors conceived an idea of constructing in the following manner a fluid feeding apparatus free from causing the aforesaid transient phenomena such as the overshooting of fluid. That is, this apparatus has adopted a flow rate control mechanism which involves actuating the flow rate control valve by pressure detection signals instead of by mass flow rate detection signals.

The present invention was designed on the basis of the aforesaid idea. That is, the present invention provides a fluid feeding apparatus comprising pressure flow controllers to regulate the flow rate of fluid, fluid changeover valves to open and close the fluid passage on the secondary side of the pressure flow controllers, and a fluid feeding control unit to control the operation of the pressure flow controllers and the fluid changeover valves. The aforesaid pressure flow controller is formed from an orifice, a control valve provided on the upstream side of the orifice, a pressure detector provided between the control valve and the orifice, and a calculation control unit which outputs a control signal Qy, that is, the difference between a flow rate signal Qc and a flow rate specifying signal Qs, the flow rate signal Qc calculated with the flow rate $Qc=KP_1$ (K=constant) on the basis of a pressure $P_1$ detected by the pressure detector, so as to control the flow rate on the downstream side of the orifice.

The present invention also provides a fluid feeding apparatus which permits the opening and closing of the control valve 1 with the pressure $P_1$ on the upstream side of the aforesaid orifice 5 held some twice or more as high as the pressure $P_2$ on the downstream side.

In one embodiment a plurality of pressure controllers are disposed side by side, the outlets of fluid changeover valves provided on the secondary sides of the respective pressure controllers are communicated with each other and connected to a fluid consumer, and different kinds of fluids are fed to the primary sides of respective pressure controllers. The electric high speed actuating type fluid changeover valve maybe a solenoid-driven type high speed actuating fluid changeover valve.

Figure 1:
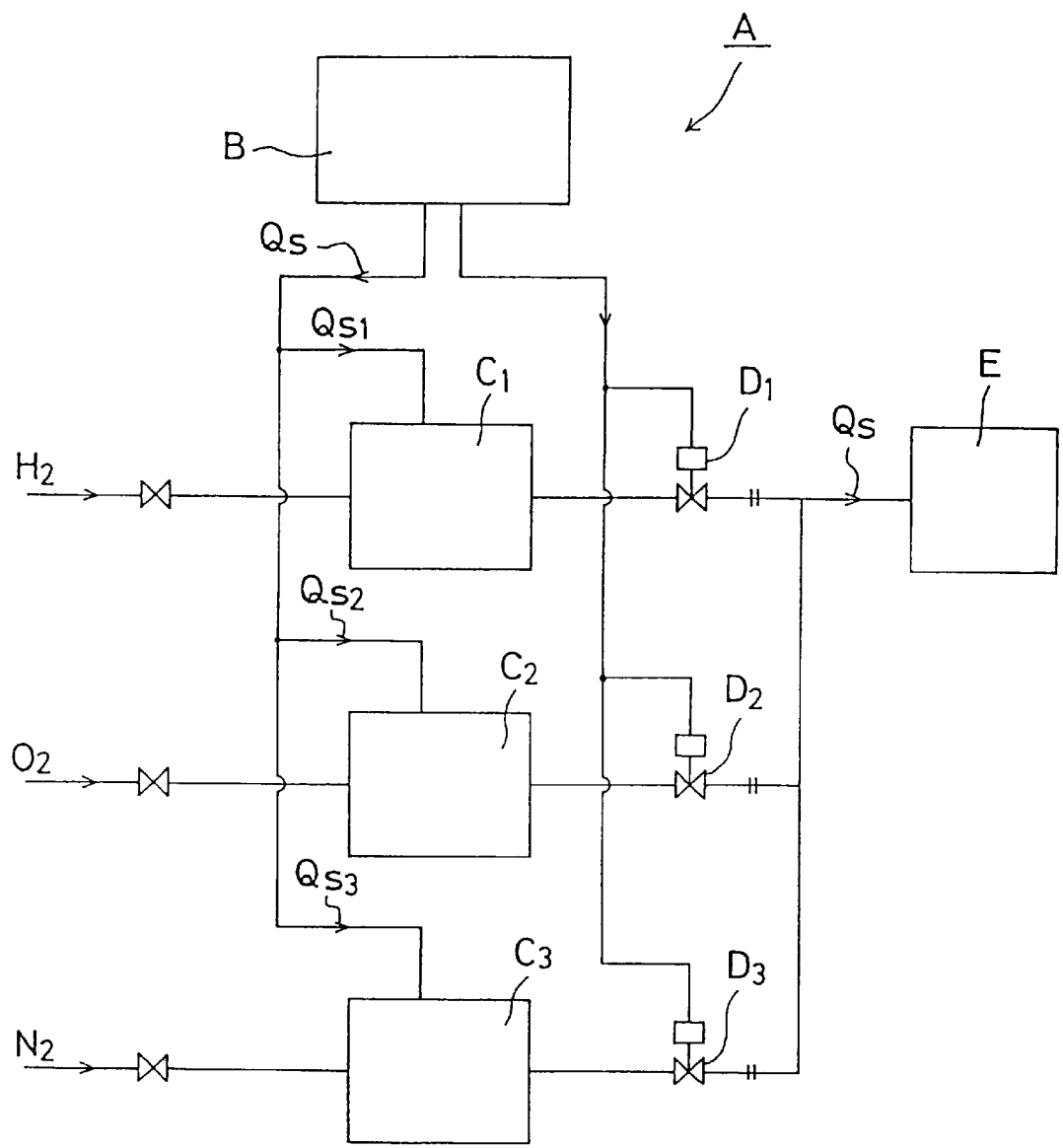
FIG. 1 is a block diagram of a gas feeding apparatus A showing an embodiment of the present invention.

The following reference letters and numerals used herein refer to the following parts in the accompanying drawings.

A fluid feeding apparatus
B fluid feeding control unit
C pressure flow controller
D fluid changeover valve
E fluid consumer
1 control valve
2 control valve drive
3 pressure detector
4 temperature detector
5 orifice
6 calculation control unit
7 amplifier
8 A/D converter
9 inversion amplifier
10 valve block
11 electric actuator (solenoid)
12 shield case
13 flow channel
14 seat
15 block
16 metal diaphragm
17 bonnet
18 bonnet nut
19 stem
20 diaphragm presser
21 spring
22 nut
23 main case
24 plunger
25 exciting coil
26 lead
27 peripheral wall
28 upper wall
29 through hole
30 ferrite bead

DESCRIPTION OF PREFERRED EMBODIMENT

Now there will be described an embodiment of a fluid feeding apparatus A according to the present invention, with reference to the drawings. FIG. 1 is a block diagram showing the fluid feeding apparatus A according to the present invention. The fluid feeding apparatus A comprises a fluid feeding control unit B, pressure flow controllers C, and fluid changeover valves D.

The present embodiment comprises three pressure flow controllers C and three fluid changeover valves D so that the supply of gas to the fluid consumer can be freely switched among $H_2$, $O_2$, and $N_2$. It goes without saying that the number of pressure flow controllers may be one or four or more.

$H_2$, $O_2$, and $N_2$ are led, at a specific pressure (approximately) from gas storage containers (not shown) through pressure regulators (not shown) to the primary sides of the pressure flow controllers C. To each pressure flow controller C is input each specific flow rate specifying signal Qs from the fluid feeding control unit B. Then the gas from the secondary side of each pressure controller C is controlled by opening the valve D to a specific set flow rate Qs and supplied to the fluid consumer E.

Figure 2:
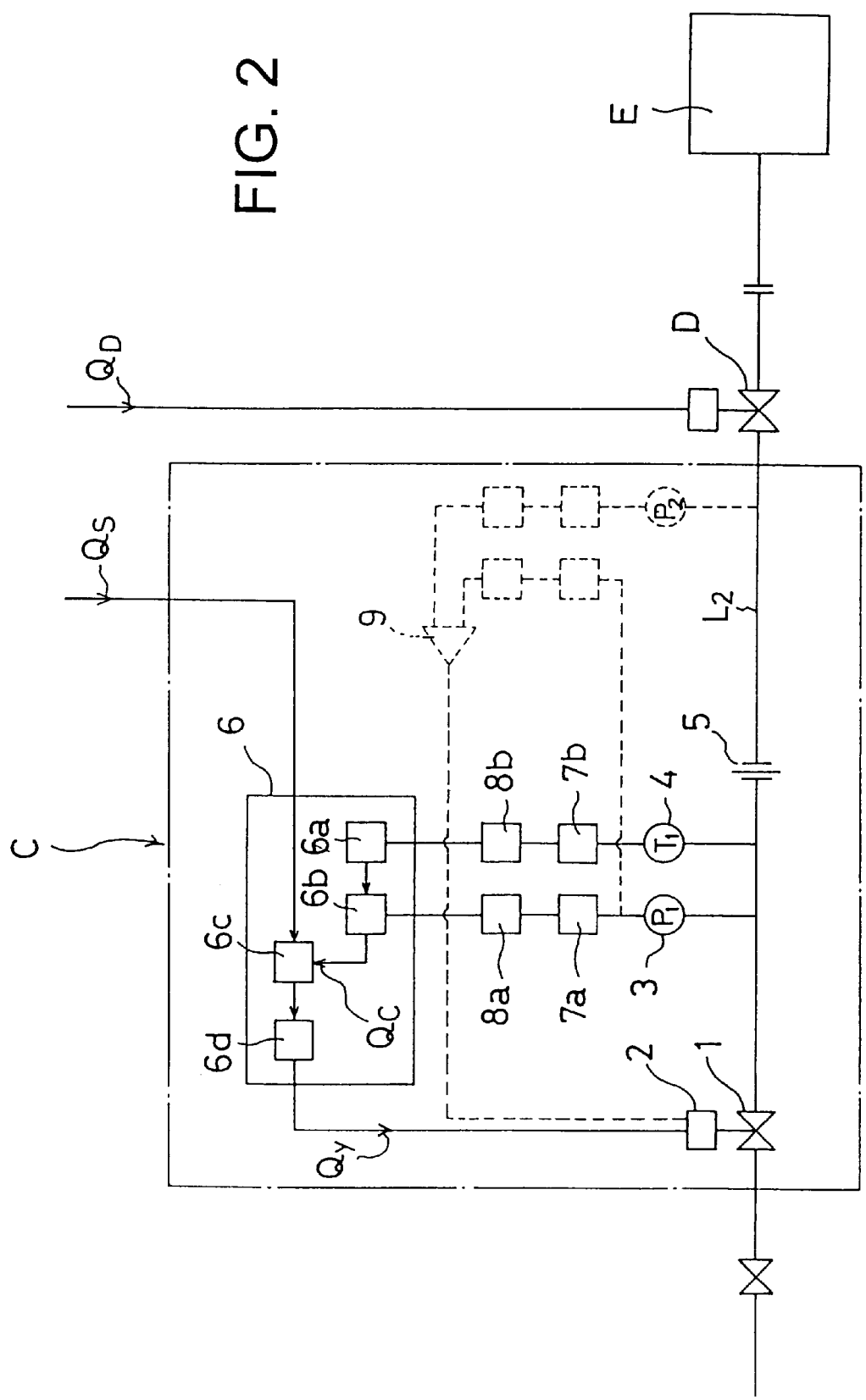
FIG. 2 is a block diagram showing an embodiment of a pressure flow controller C used in the present invention.

FIG. 2 shows an embodiment of the pressure flow controller C used in the present invention. The pressure flow controller C includes a control valve 1; a control valve drive 2; a pressure detector 3; a temperature detector 4; an orifice 5; a calculation control unit 6; amplifiers 7a, 7b; A/D converters 8a, 8b; and other features.

The control valve 1 is a so-called direct touch-type metal diaphragm valve, and its drive is a piezoelectric element-type drive. The pressure detector 3 is a semiconductor strain type pressure sensor. The temperature detector 4 is a thermocouple type temperature sensor. Needless to say, the aforesaid drive, pressure sensor, temperature sensor, etc., may be of any type.

The orifice 5 is an orifice made by electric discharge machining a plate-shaped metal gasket. Also, an ultra-thin pipe or an orifice formed in a metal film by etching may be used as orifice 5. The calculation control unit 6 is formed of what is called the control circuit board, and is equipped with a temperature correction circuit 6a, a flow rate calculation circuit 6b, a comparison circuit 6c, an amplifier circuit 6d, etc. It is noted that in case the calculation control unit 6 is used in an atmosphere at a constant temperature as in a clean room, the temperature correction circuit 6a may be omitted without affecting the performance of the calculation control unit 6.

Figure 3:
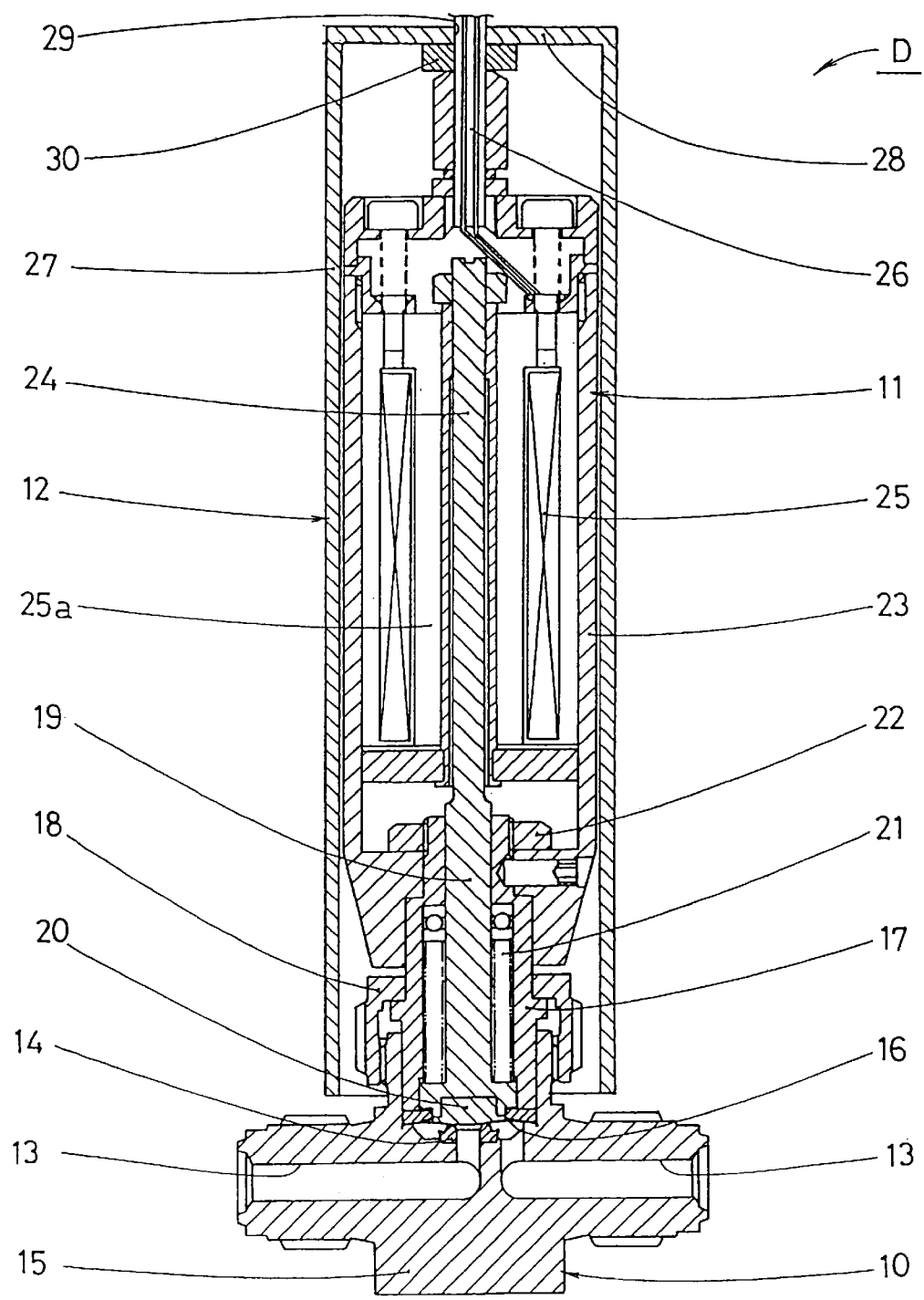
FIG. 3 is a vertical, sectional view of a fluid changeover valve D used in the present invention.

FIG. 3 is a vertical, sectional view showing a fluid changeover valve D used in the present invention. The main part of the changeover valve D includes a valve body 10, an electric actuator 11, and a shield case 12. In this example, the electric actuator 11 is a solenoid.

The valve block 10 controls the flow of fluid by opening and closing the valve. The valve used in this example is of the normally closed type. That is, the valve block 10 is formed out of a body 15 provided with a flow channel 13 and a seat 14 therein, a diaphragm 16 made of metal (nickel-based alloy) so provided to be able to sit on the seat 14, a bonnet 17, a bonnet nut 18, a stem 19 extending through the bonnet and movable up and down, a diaphragm presser 20 to press the diaphragm 16, and a spring 21 to always thrust the stem 19 downward (to close the valve).

The electric actuator 11 is a solenoid. The electric actuator 11 comprises a case 23 fastened to the bonnet 17 by a nut 22, a plunger 24 provided in continuity with the stem 19 of the valve block 10, an exciting coil 25 and an iron rod 25a for moving the plunger 24, and a lead 26.

The case 23 is made of aluminum, but may be made of a high magnetic permeability material such as permalloy.

The case 12 is provided outside of the main case 23 with a small space provided therebetween and prevents the leakage of the magnetic field. In the present example, the shield case 12, cylindrical and opening at the lower end, comprises a peripheral wall 27 covering the outside of the electric actuator 11, an upper wall 28 covering the upper side of the electric actuator 11, and a through hole 29 with the lead 26 extending therethrough, and is fit over the main case 23. The shield case 12 is made of a one-mm-thick sheet of permalloy or malleable iron. The shield case 12 to contain the magnetic field has the ferrite bead 30 at a portion where the lead 26 passes through the upper wall 28. The ferrite bead is ring-formed and fitted around the lead 26 inside (under) the upper wall 28 so as to fill up the gap between the lead 26 and the through hole 29.

Next the operation of the fluid feeding apparatus A will be explained.

Referring to FIGS. 1 and 2, the gas pressure $P_1$ on the outlet side of the control valve 1, that is, on the upstream side of the orifice 5, is detected by the pressure detector 3 and sent to the amplifier 7a and the A/D converter 8a to be digitized. The signals thus digitized are then input in the flow calculation circuit 6b.

Likewise, the gas temperature T1 on the upstream side of the orifice 5 is detected by the temperature detector 4 and referred to the amplifier 7b and A/D converter 8b to be digitized. The digitized signals are then input in the temperature correction circuit 6a. In case the temperature correction circuit 6a is omitted, flow rate calculation can be done with analog signals so as to simplify the control circuit.

The calculation control unit 6 calculates the flow rate $Q'=KP_1$ on the basis of the upstream fluid pressure $P_1$ and effects the temperature correction of the flow rate Q' according to correction signals from the temperature correction circuit 6a. The calculated flow rate signal Qc is then input in the comparison circuit 6c.

In the meantime, the flow rate specifying signal Qs has been input in the comparison circuit 6c, where the calculated flow rate signal Qc and the flow rate specifying signal Q are compared and the differential signal Qy=Qc−Qs is output as control signal to the drive 2 of the control valve 1.

If the calculated flow rate signal Qc is larger than the flow rate specifying signal Qs, the drive 2 moves to close the control valve 1. If the signal Qc is smaller than the signal Qs, the drive 2 moves to open the valve 1. That way, the control valve 1 is opened or closed automatically to bring the signal Qc equal to the signal Qs.

Needless to say, it is desirable in the present invention that the ratio of the fluid pressure $P_2$ on the downstream side of the orifice 5 to the upstream fluid pressure $P_1$ on the upstream side, that is, $P_2/P_1$, is always not larger than about 0.5. That means that the fluid pressure $P_1$ on the upstream side of the orifice 5 is about twice or more as high as the fluid pressure $P_2$ on the downstream side.

In this regard, it may be configured so that the fluid pressure $P_1$ on the upstream side of the orifice 5 and the fluid pressure $P_2$ on the downstream are input in the inversion amplifier 9, as shown by dotted lines in FIG. 2 wherein, if the pressure $P_1$ and the pressure $P_2$ are reversed in amount—a situation in which back flow may arise—or $P_2/P_1>0.5$ occurs—a situation in which, while there is no back flow, the flow cannot be controlled with high precision—the control valve 1 will automatically shut.

In case the solenoid 11 is not excited, the plunger 24, the stem 19, and the diaphragm presser 20 are brought down by the elastic force of the spring 21 so that the diaphragm 16 is forced to rest on the seat 14 through the diaphragm presser 20, as shown in FIG. 3. That way, the fluid changeover valve D is closed.

If the solenoid is energized, then the plunger 24, the stem 19, and the diaphragm presser 20 go up against the elastic force of the spring 21 and the diaphragm 16 will return to its original form by its own elastic force and leave the seal 14. As a result, the fluid changeover valve D will open.

The electric high-speed actuating type fluid changeover valve in the present invention will open or close in less than 10 msec as against an average 100 msec for the prior art pneumatic fluid changeover valve. That is, the electric high-speed changeover valve works some 10 times as fast.

It is also noted that when the solenoid 11 is energized (in the initial energizing and holding energizing), the magnetic field leaks out from the exciting coil 25. But since the shield case 12 is provided outside of the solenoid 11, the leaked magnetic field is contained and shut off by the shield case 12.

In the pressure flow controller C according to the present invention, if the fluid changeover valve D is actuated in the direction in which the valve D is closed, the fluid pressure $P_1$ on the primary side of the orifice 5 will rise and the fluid flow rate $Q'=KP_1$ will increase, as shown in FIG. 2. Then the difference Qy from the set flow rate Qs (Qs=0) will grow. To bring that down, that is, to decrease the fluid pressure $P_2$ on the secondary side, the control valve 1 will be closed.

The actuating mechanism of the pressure flow controller C according to the present invention is summarized in the comparison with that of the prior art, that is, the mass flow controller as in the following table. Because of its mechanism, the pressure flow controller C according to the present invention does not allow the fluid to dwell on the secondary side L of the controller C.

TABLE 1

| Closing of high-speed switch-over valve | |
| --- | --- |
| Mass flow controller | Control valve opens → Secondary side pressure increases → Fluid dwells |
| Pressure flow controller | Control valve closes → Secondary side pressure decreases → No fluid dwells |

Figure 4:
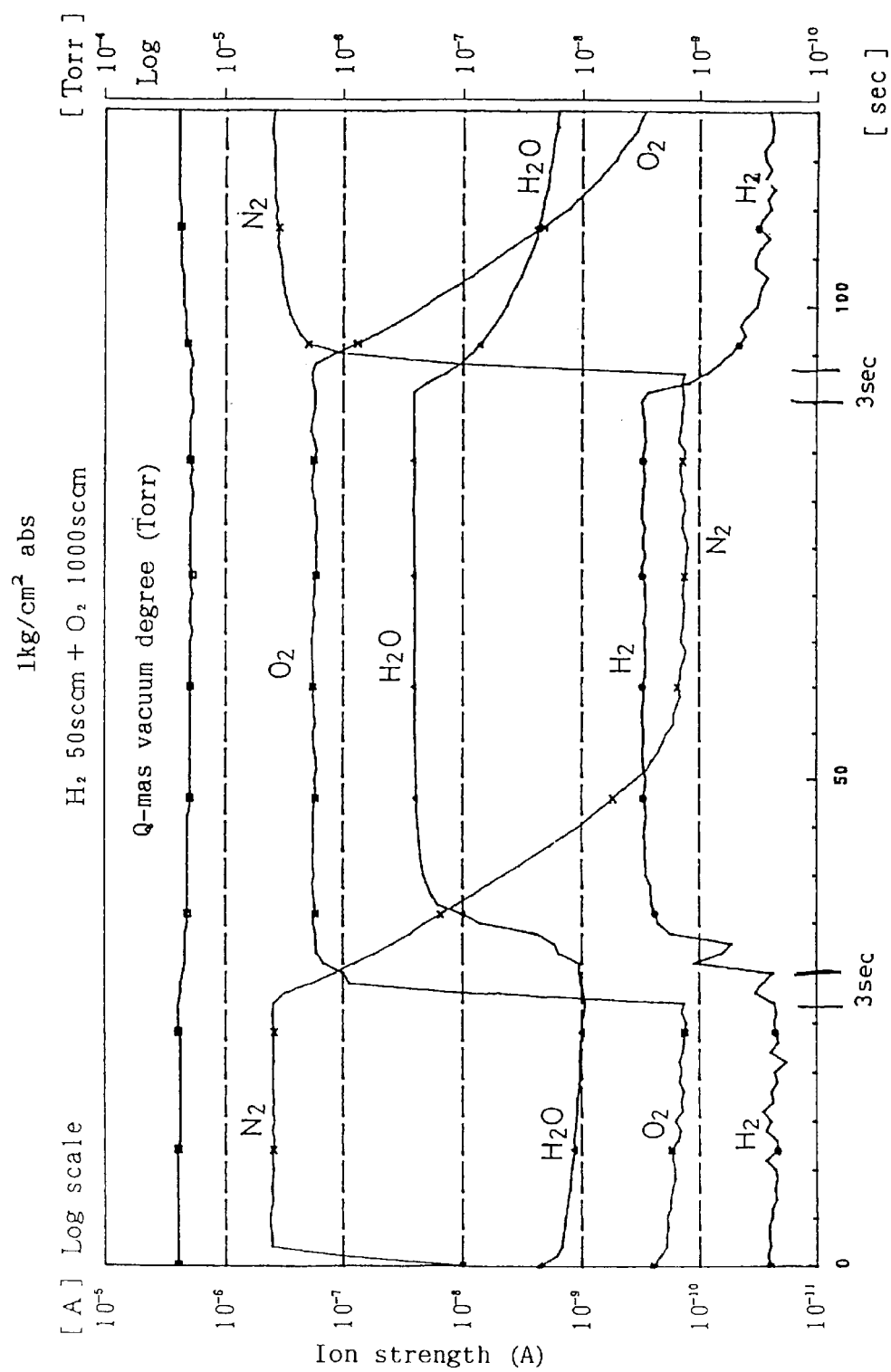
FIG. 4 is a diagram showing changes with time in concentrations of $H_2$, $O_2$, $N_2$, and $H_2O$ with the pressure on the secondary side of the pressure flow controllers according to the present invention set at 1 kg/cm² abs using the testing arrangement shown in FIG. 8.
Figure 8:
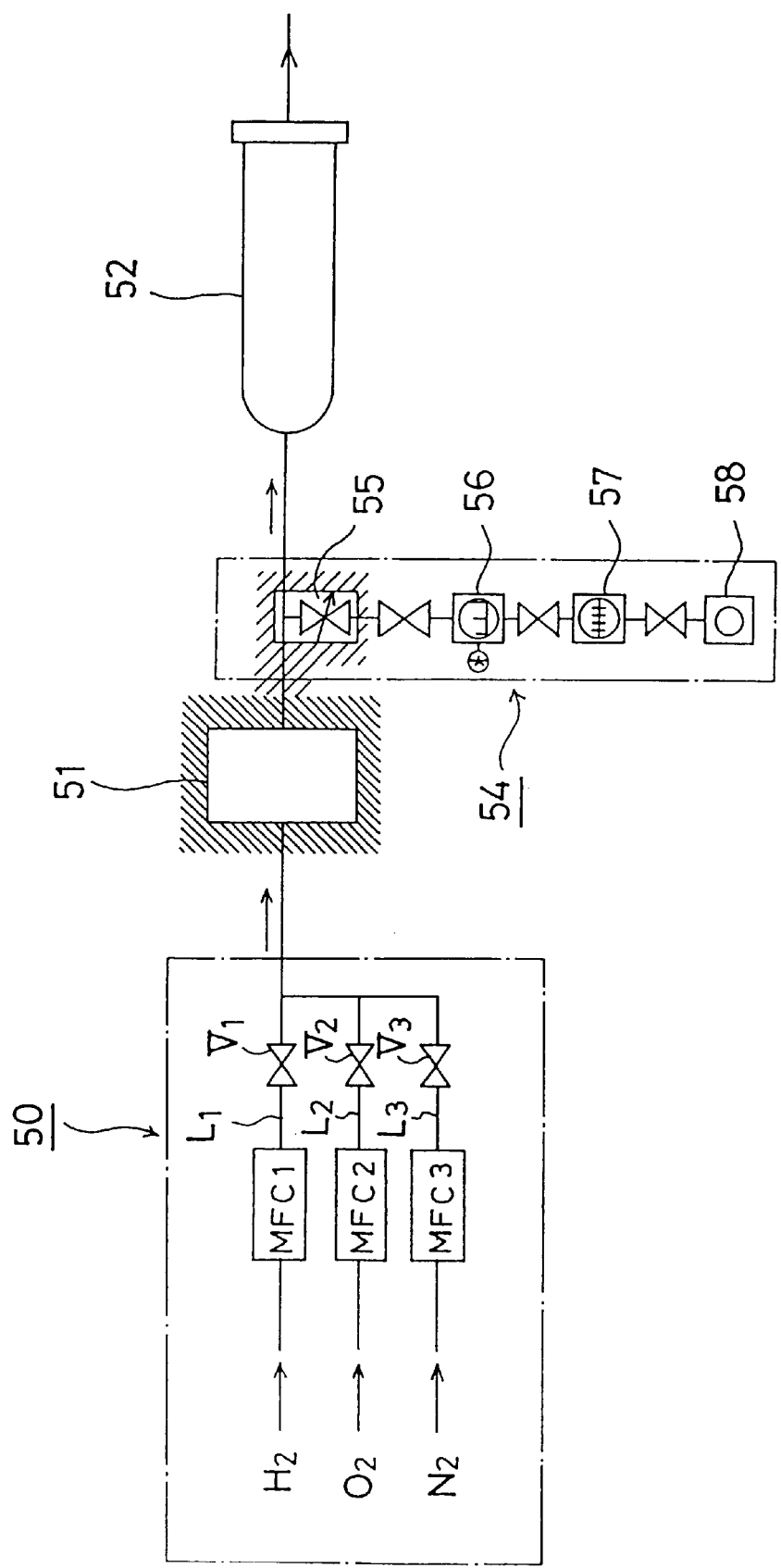
FIG. 8 is an overall system diagram of a moisture generation testing arrangement equipped with a gas feeding apparatus in which the prior art mass flow controllers are mounted.
Figure 9:
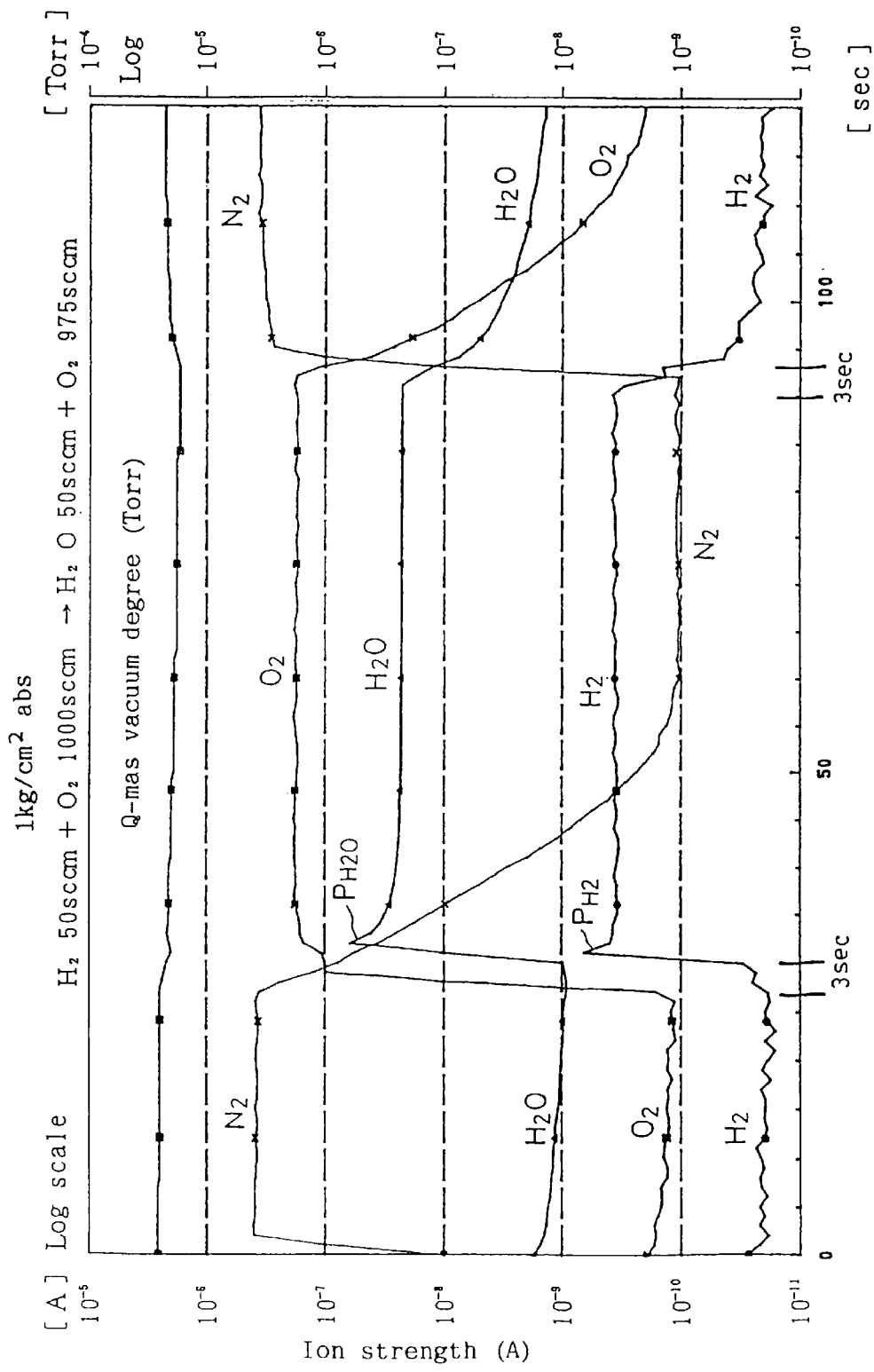
FIG. 9 is a diagram showing changes with time in concentrations of $H_2$, $O_2$, $N_2$, and $H_2O$ with the pressure on the secondary side of the mass flow controllers set at 1 kg/cm² abs in the testing arrangement shown in FIG. 8.

FIG. 4 shows changes with time in concentrations of $H_2$, $O_2$, $N_2$, and $H_2O$ measured when moisture was generated under the same conditions as in FIG. 9 in the same moisture generating testing arrangement as shown in FIG. 8 except that the pressure flow controllers $C_1$ to $C_3$ were installed in place of the prior art mass flow controllers $MFC_1$ to $MFC_3$.

Figure 5:
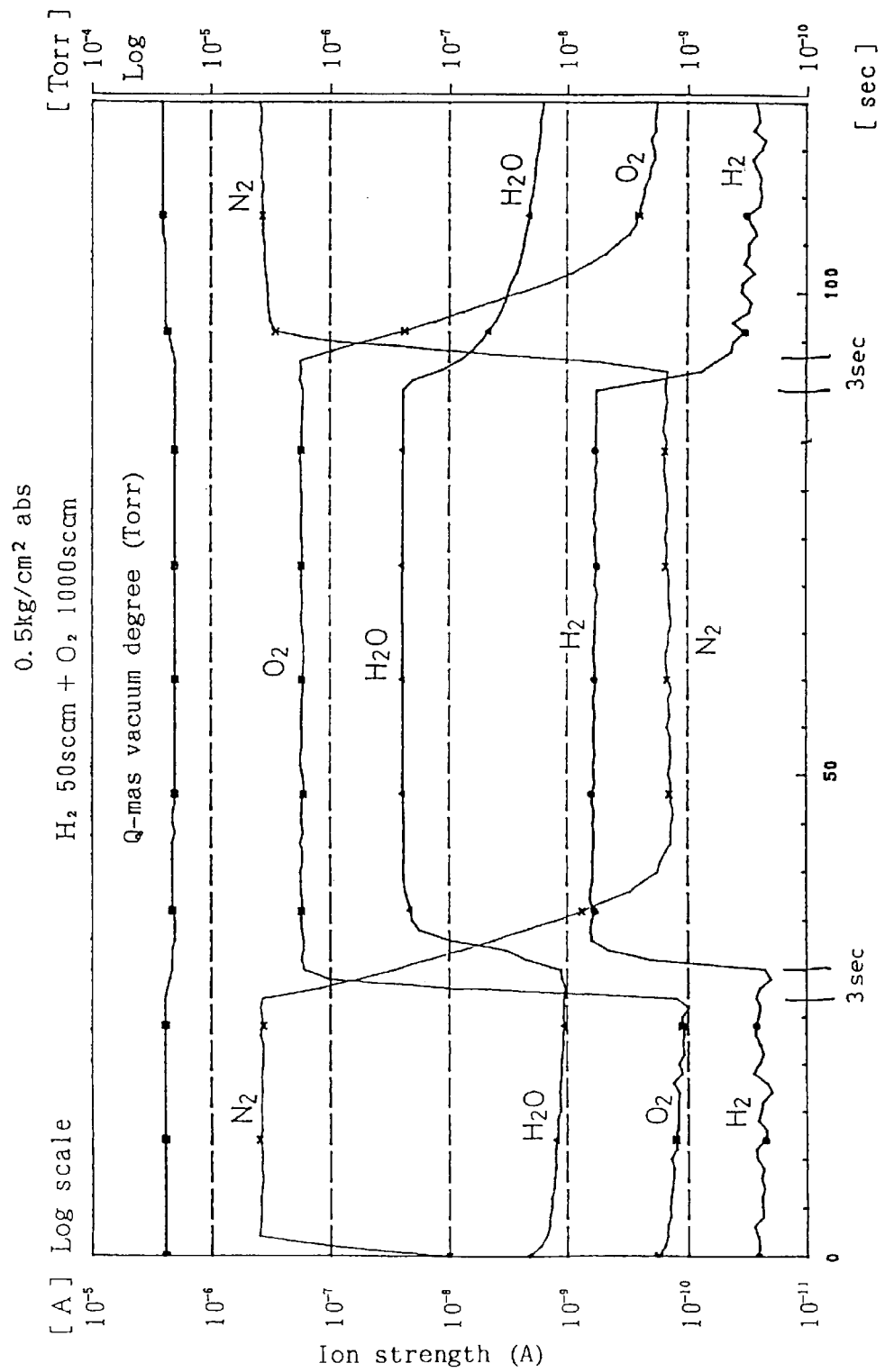
FIG. 5 is a diagram showing changes with time in concentrations of $H_2$, $O_2$, $N_2$, and $H_2O$ with the pressure on the secondary side of the pressure flow controllers set at 0.5 kg/cm² abs.
Figure 10:
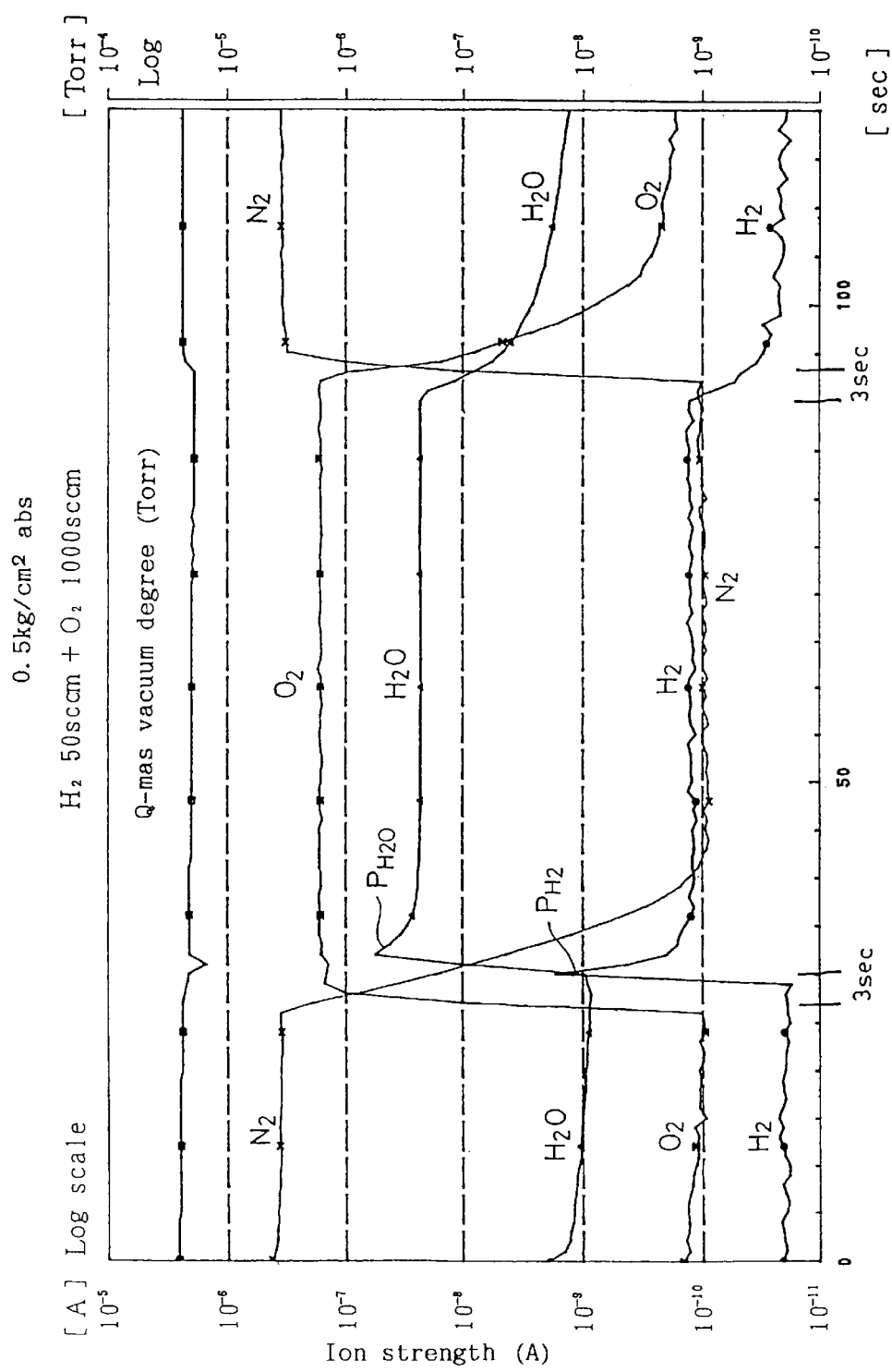
FIG. 10 is a diagram showing changes with time in concentrations of $H_2$, $O_2$, $N_2$, and $H_2O$ with the pressure on the secondary side of the mass flow controllers set at 0.5 kg/cm² abs.

Likewise, FIG. 5 shows changes with time in concentrations of $H_2$, $O_2$, $N_2$, and $H_2O$ measured in the moisture generating tests under the same conditions as in FIG. 10 using the fluid feeding apparatus A of the present invention.

Figure 6:
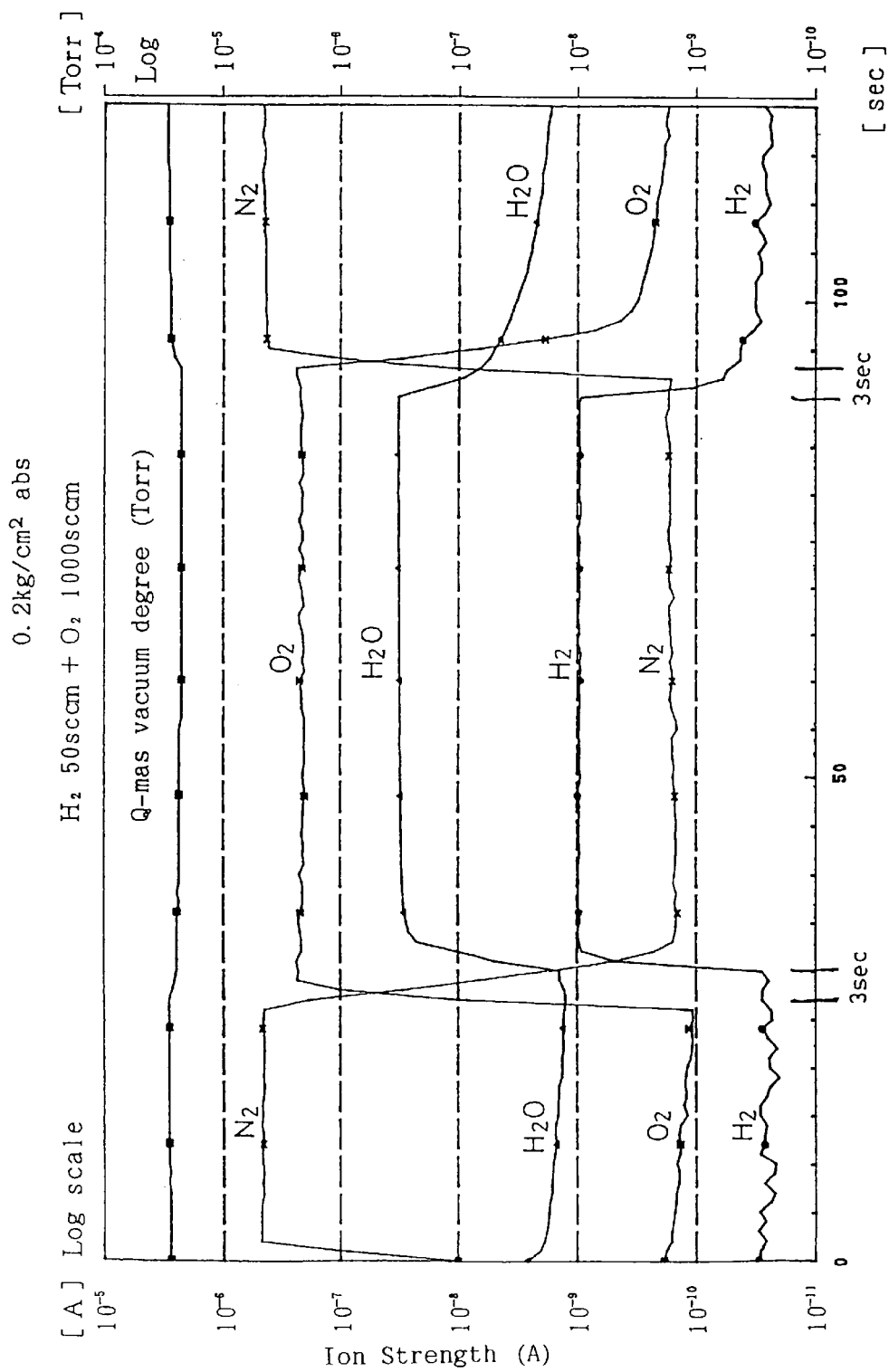
FIG. 6 is a diagram showing changes with time in concentrations of $H_2$, $O_2$, $N_2$, and $H_2O$ with the pressure on the secondary side of the pressure flow controllers set at 0.2 kg/cm² $^{abs.}$
Figure 11:
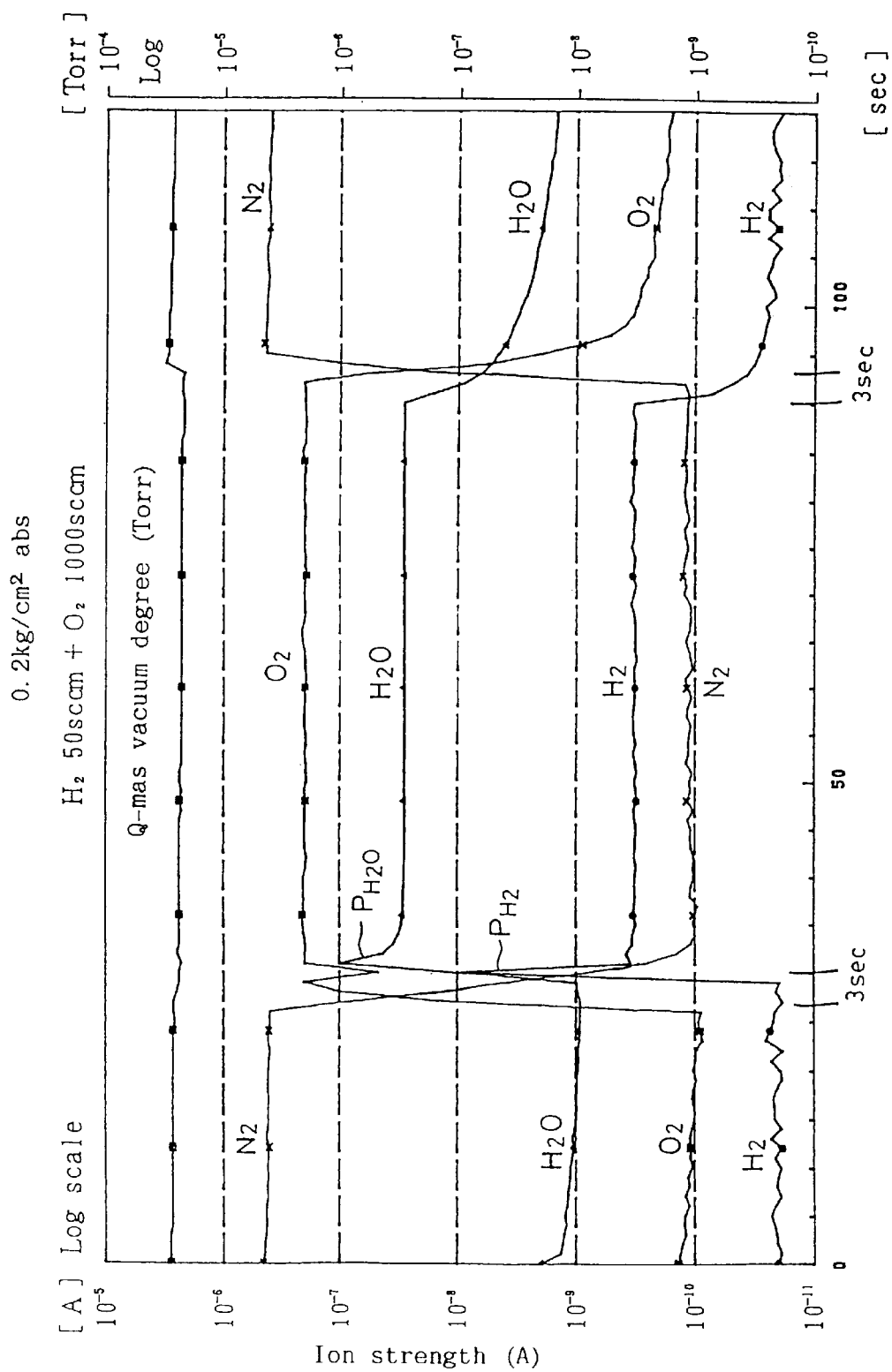
FIG. 11 is a diagram showing changes with time in concentrations of $H_2$, $O_2$, $N_2$, and $H_2O$ with the pressure on the secondary side of the mass flow controllers set at 0.2 kg/cm² abs.

FIG. 6 shows changes with time in concentrations of $H_2$, $O_2$, $N_2$, and $H_2O$ measured in the moisture generating tests under the same conditions as in FIG. 11 using the fluid feeding apparatus A of the present invention.

Figure 7:
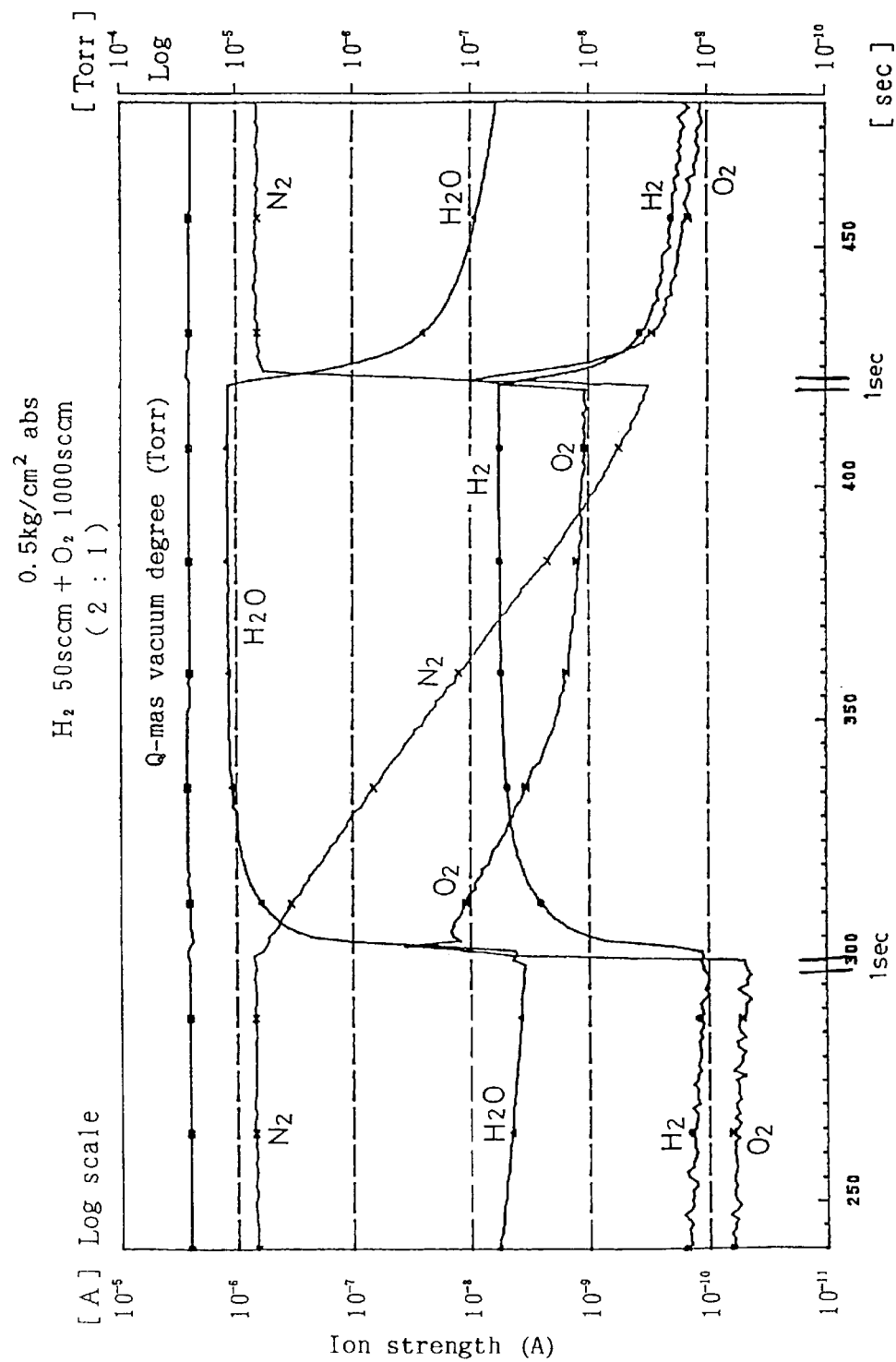
FIG. 7 is a diagram showing changes with time in concentrations of $H_2$, $O_2$, $N_2$, and $H_2O$ with the pressure on the secondary side of the pressure flow controllers set at 1 kg/cm² abs and with the feeding of $H_2$ and $O_2$ at the ratio of 2 to 1 started and suspended simultaneously in the testing arrangement shown in FIG. 8.
Figure 12:
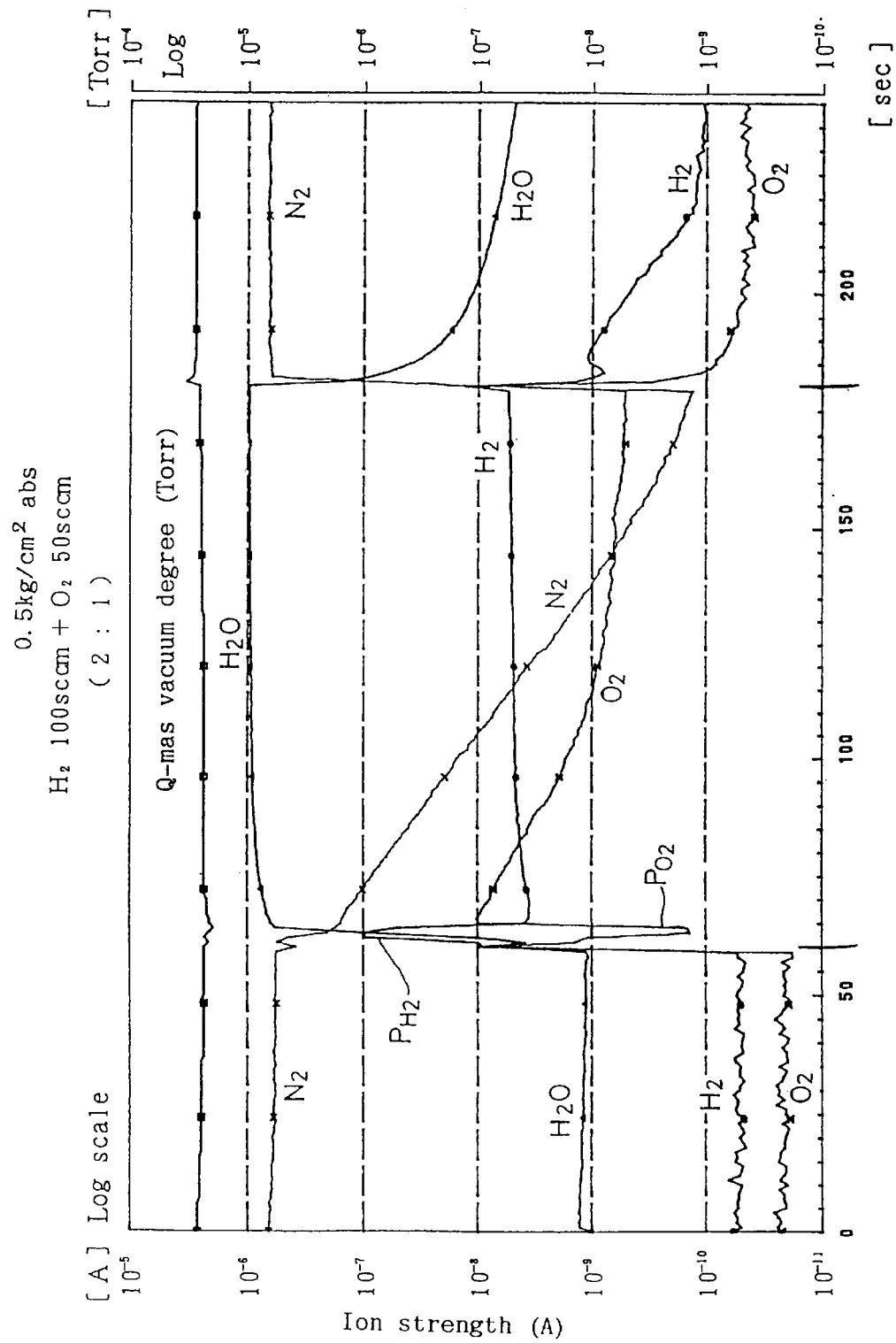
FIG. 12 is a diagram showing changes with time in concentrations of $H_2$, $O_2$, $N_2$, and $H_2O$ with the pressure on the secondary side of the mass flow controllers set at 1 kg/cm² abs and with the feeding of $H_2$ and $O_2$ at the ratio of 2 to 1 started and suspended simultaneously in the testing arrangement shown in FIG. 8.
Figure 13:
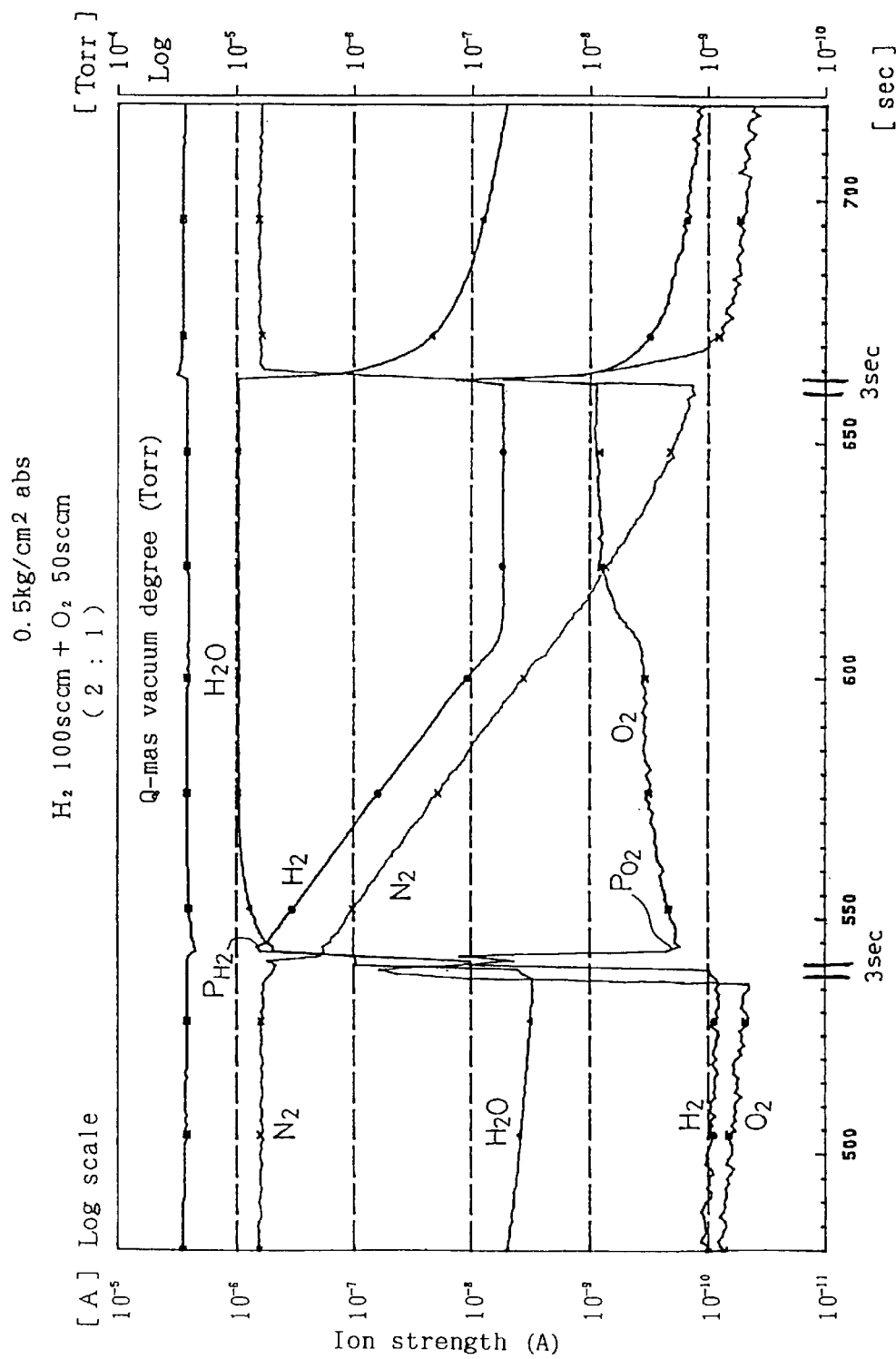
FIG. 13 is a diagram showing changes with time in concentrations of $H_2$, $O_2$, $N_2$, and $H_2O$ , with the feeding of $H_2$ started three seconds after $O_2$ supply and suspended three seconds earlier than $O_2$ suspension in the same test as in FIG. 12.
Figure 14:
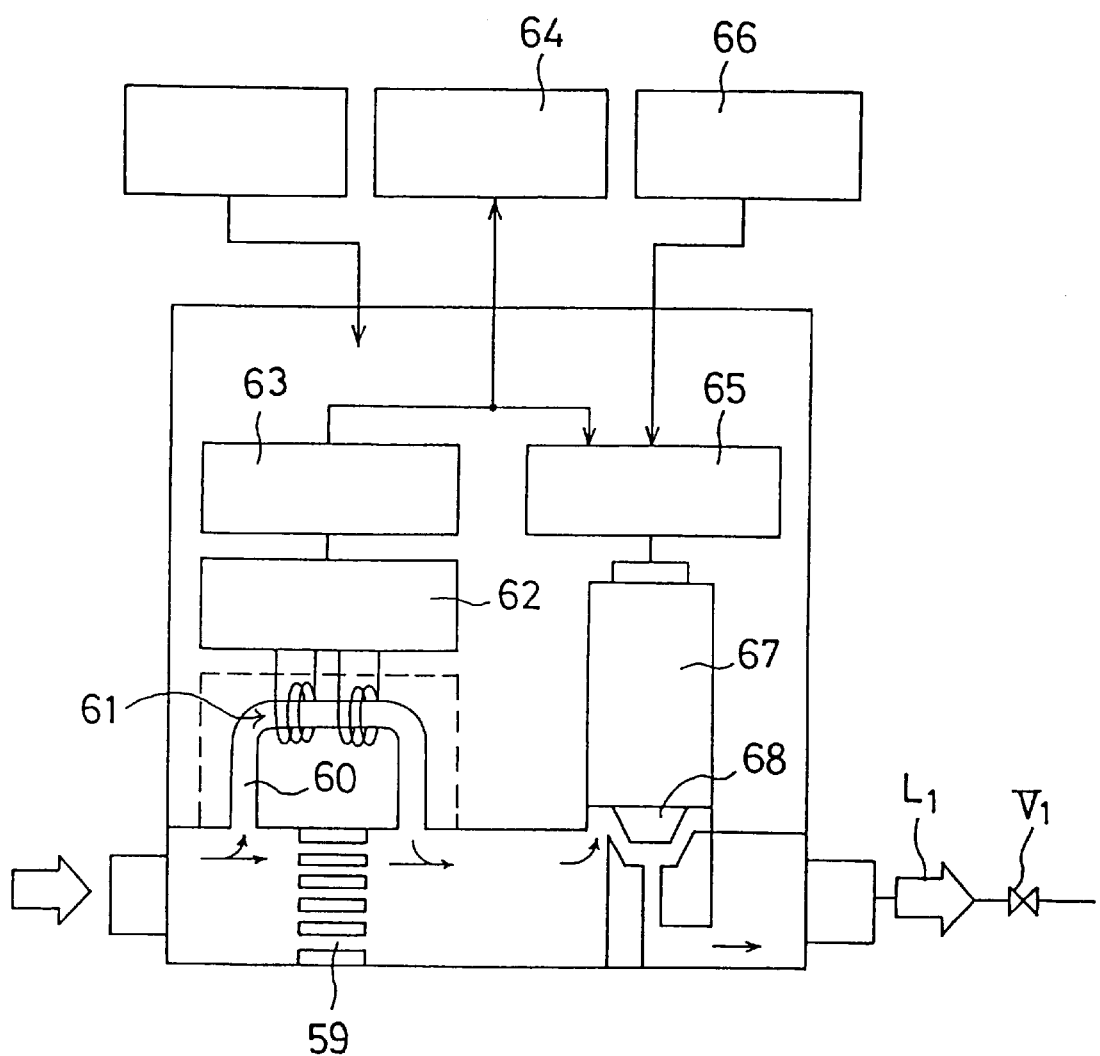
FIG. 14 is a block diagram showing the basic configuration of the prior art mass flow controller.

FIG. 7 shows changes with time in concentrations of $H_2$, $O_2$, $N_2$, and $H_2O$ measured in the moisture generating tests under the same conditions as in FIG. 12—100 sccm $H_2$+50 sccm $O_2$, that is $H_2:O_2=2:1$—using the fluid feeding apparatus A of the present invention.

As comparisons between FIGS. 4 and 9, FIGS. 5 and 10, FIGS. 6 and 11, and FIGS. 7 and 13 indicate, it has been found that even if the set pressure on the secondary side is lowered in the fluid feeding apparatus A of the present invention, peak values of $H_2$ and $H_2O$ will not appear at all.

The fluid feeding apparatus of the present invention shown in FIG. 1 has three units of the pressure flow controller C installed therein. It is understood that the number of units is changed depending on the number of kinds of fluids (gases) to be supplied.

It is also noted that in the fluid feeding apparatus of the present invention, a solenoid-driven high-speed actuating valve is used as electric fluid changeover valve D. The type of the fluid changeover valve D is not limited to the solenoid-type high-speed actuating changeover valve but may be of the piezoelectric element drive type such as piezoelectric ceramic.

EFFECTS OF THE INVENTION

In the present invention, the flow rate regulator, which is the core of the fluid feeding apparatus, is a pressure flow controller. This pressure flow controller is actuated to decrease the pressure on the secondary side when the flow changeover valve is closed. Thus the structural characteristics of the pressure flow controller are utilized effectively in this fluid feeding apparatus.

That makes it possible to control the flow of fluid or the moisture generation with high precision without giving rise to transient phenomena such as overshooting of fluid even at the start of fluid feeding or in a transient state such as switchover of feeding fluids. Furthermore, the fluid changeover valve adopted is a solenoid-driven high-speed actuating valve, which speeds up such operations as changeover from one kind of fluid to another. That and no fluid overshooting help to form ideal initial film in the manufacture of semiconductors and contribute greatly to improvement of high-integration semiconductors.

Thus, the present invention would bring about highly practical effects.

What is claimed is:

1. A fluid feeding apparatus comprising:
    a fluid passage having a pressure flow controller therein for regulating fluid flow rate therethrough;
    a fluid changeover valve, disposed in said fluid passage in a downstream direction from said pressure flow controller, for selectively opening and closing said fluid passage;
    said pressure flow controller including,
        an orifice,
        a control valve disposed on an upstream side of said orifice, said orifice being disposed in said fluid passage in an upstream direction from said fluid changeover valve,
        a pressure detector disposed between said control valve and said orifice, and,
        a calculation control unit for producing a control signal Qy for controlling said control valve, said calculation control unit calculating said control signal according to the equation $Qy=Qc-Qs$, where Qc is a flow rate signal and Qs is a flow rate specifying signal, said calculation control unit calculating said flow rate signal Qc according to the equation $Qc=KP1$, where K is a constant, and P1 is a pressure detected by said pressure detector; and,
    a fluid feeding control unit for applying said signal Qs to said calculation control unit and applying actuation signals to said changeover valve to open or close said changeover valve, said fluid feeding control unit concurrently applying a signal $Qs=0$ to said calculation control unit and when applying an actuation signal to close said changeover valve,
    whereby said control valve is closed when said changeover valve is closed.

2. A fluid feeding apparatus comprising:
    first and second fluid passages each having a pressure flow controller therein for regulating fluid flow rate therethrough, said first and second fluid passages being joined at a downstream extent and connected to a consumer;
    first and second fluid changeover valves, disposed in said first and second fluid passages, respectively, in a downstream direction from the pressure flow controllers, for selectively opening and closing said fluid passages;
    said pressure flow controllers each including,
        an orifice,
        a control valve disposed on an upstream side of said orifice, said orifice being disposed in the fluid passage in an upstream direction from the fluid changeover valve,
        a pressure detector disposed between the control valve and the orifice, and,
        a calculation control unit for producing a control signal Qy for controlling the control valve, said calculation control unit calculating the control signal Qy according to the equation $Qy=Qc-Qs$, where Qc is a flow rate signal for the fluid passage in which one flow controller is located and Qs is a flow rate specifying signal for the fluid flow passage in which said one flow controller is located, a calculation control unit calculating the flow rate signal Qc for a given one of the fluid passages according to the equation Qc=KP1, where K is a constant, and P1 is a pressure in said given one fluid flow passage detected by the pressure detector; and, a fluid feeding control unit for applying the signals Qs to said first and second calculation control units and applying actuation signals to said first and second fluid changeover valves to open or close said fluid changeover valves, said fluid feeding control unit applying a signal Qs=0 to said first or second calculation control unit and concurrently applying an actuation signal to close said first or second fluid changeover valve, whereby the control valve in said first or second fluid passage is closed when the fluid changeover valve in the first or second passage, respectively, is closed.

3. A fluid feeding apparatus as claimed in claim 2, wherein hydrogen and oxygen, are fed to the control valves if said first and second pressure controllers, respectively, hydrogen being fed one to three seconds after oxygen has started to be fed when supplying a mixture gas of hydrogen and oxygen to the fluid consumer.

4. A fluid feeding apparatus comprising:

at least three pressure flow controllers arranged in parallel fluid passages to regulate fluid flow rates through said passages, fluid changeover valves provided to open and close respective fluid passages on the secondary sides of respective pressure flow controllers, and a fluid feeding control unit for controlling actuation of the pressure flow controllers and the fluid changeover valves, said pressure flow controllers each including: an orifice, a control valve disposed on an upstream side of said orifice, a pressure detector disposed between the control valve and said orifice, and a calculation control unit which inputs a drive for said control valve a difference between a flow rate signal Qc and a flow rate specifying signal Qs as a control signal Qy, said flow rate signal Qc calculated with the flow rate Qc=KP1, where K is a constant, on the basis of a pressure P1 detected by the pressure detector, wherein the flow rates on downstream sides of the orifices are controlled by regulating the pressures P1 on the upstream sides of the orifices through the opening and closing of the control valves, wherein said fluid passages are connected with each other and connected to a fluid consumer at downstream sides of said fluid changeover valves, and, wherein different kinds of fluids are fed to primary sides of said pressure flow controllers.

5. A fluid feeding apparatus as claimed in claim 4, wherein the fluids supplied to the primary sides of a plurality of the pressure flow controllers are hydrogen and oxygen, and hydrogen starts to be fed one to three seconds after oxygen has started to be fed when supplying a mixture gas of hydrogen and oxygen to the fluid consumer.

6. The fluid feeding apparatus as claimed in claim 4, wherein the control valves are controlled to open and close with the pressure P1 on the upstream side of the orifices held about twice or more as high as a pressure P2 at the downstream sides of the orifices.

* * * * *